W. P. COOK AND H. O. BAKER.
ENGINE FRAME.
APPLICATION FILED JUNE 19, 1918.
1,336,729.
Patented Apr. 13, 1920.
2 SHEETS—SHEET 1.
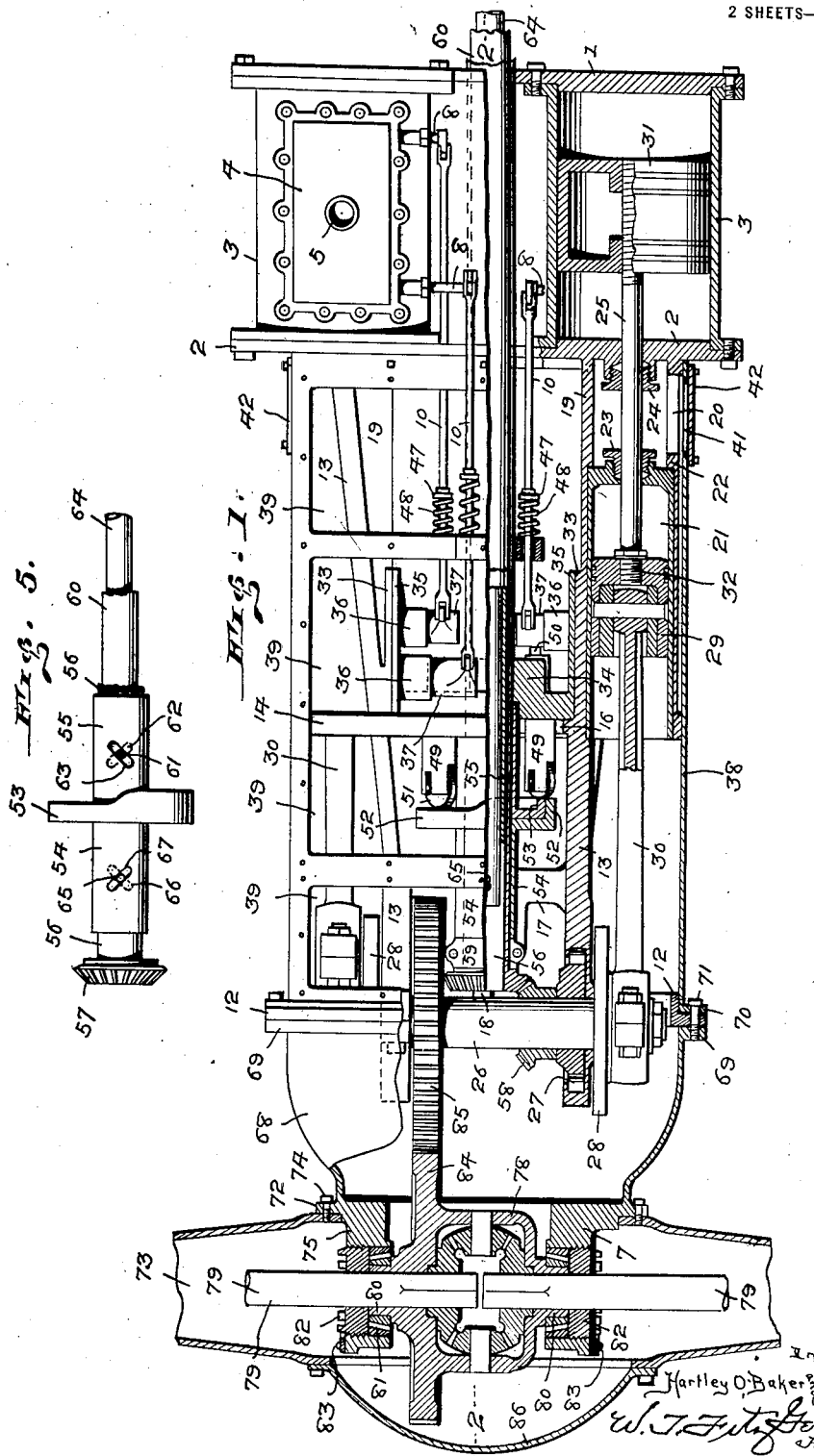

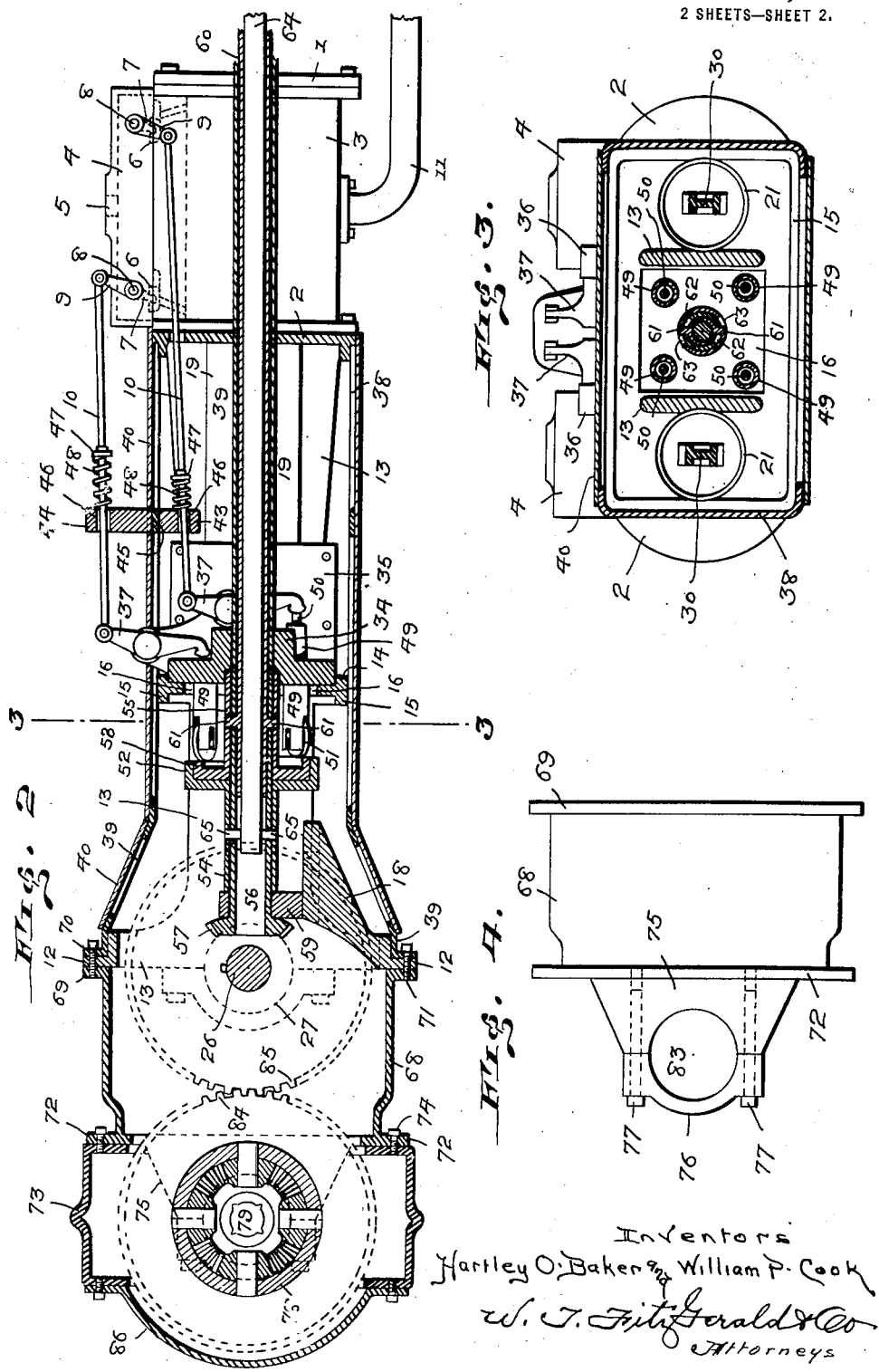

UNITED STATES PATENT OFFICE.

WILLIAM P. COOK AND HARTLEY O. BAKER, OF PUEBLO, COLORADO, ASSIGNORS TO THE BAKER STEAM MOTOR CAR AND MANUFACTURING CO., INC., OF PUEBLO, COLORADO.

ENGINE-FRAME.

1,336,729.   Specification of Letters Patent.   Patented Apr. 13, 1920.

Application filed June 19, 1918. Serial No. 240,828.

*To all whom it may concern:*

Be it known that we, WILLIAM P. COOK and HARTLEY O. BAKER, citizens of the United States, residing at Pueblo, in the county of Pueblo and State of Colorado, have invented certain new and useful Improvements in Engine-Frames; and we do hereby declare the following to be a full, clear, and exact description of the invention, such as will enable others skilled in the art to which it appertains to make and use the same.

This invention relates to engine construction and has for its primary object to provide a multiple cylinder fluid expansion engine of the uniflow type, constructed in a simple, novel and practical manner.

A still further object of the invention is to provide improved means for connecting the engine to the standard rear axle housing of an automobile.

A still further object of the invention is to construct the engine in such a manner that it can be quickly and readily disconnected from the rear axle housing and then disassembled.

A further object of the invention is to provide an engine of the above stated character for motor vehicles embodying means for directly driving the vehicle power pumps.

With these and other objects in view as will appear as the description proceeds, the invention comprises the various novel features of construction, combination, and arrangement of parts as will be fully described hereinafter and afterward specifically claimed.

Referring to the accompanying drawings:

Figure 1 represents a sectional plan view of the engine and its connection to the rear axle housing.

Fig. 2 represents a vertical longitudinal sectional view taken on a plane indicated by the line 2—2 on Fig. 1.

Fig. 3 represents a transverse sectional view taken on plane indicated by the line 3—3 on Fig. 2.

Fig. 4 represents a side elevation of the coupling unit, and Fig. 5 represents a detailed plan view of the valve cams.

In order that the construction and operation of the invention may be readily comprehended by those skilled in the art to which this invention relates, we have illustrated the preferred embodiment thereof in the accompanying drawings and will now proceed to fully describe the same, in connection with said drawings, in which 1 and 2 are the cylinder head plates between which are positioned the cylinders 3, each provided with the usual valve chest 4 having a fluid inlet 5. 6 are inlet valves actuated by arms 7 mounted on the inner ends of rock shafts 8. The outer ends of these rock shafts carry arms 9 to which are connected the valve rods 10. Each cylinder is provided with an exhaust 11.

The main engine frame is formed integral with the cylinder head plate 2 and comprises a right angular ring frame 12 spaced from and connected to the head plate by a pair of parallel frame members 13.

14 is a cross plate formed integral with the frame members 13 at a point intermediate their ends and is provided with oppositely extending circumferential flanges 15 and a central opening 16.

17 indicates a supporting bracket connected between the ends of the frame members 13 and reinforced by a web 18 extending downwardly to the ring frame 12.

Formed integral with each of the frame members 13 and the head plate 2 is a crosshead casing 19 provided with a hand hole 20 adjacent its forward end. A cross-head bushing 21 is fitted within each of the casings until it abuts against the shoulder 22, each bushing being provided with a central aperture and a packing gland to correspond with the aperture in the head plate 2 and the packing gland 24 through which the piston rod 25 slides.

The engine crank shaft 26 is removably mounted in suitable bearings 27 in the rear ends of the frame members 13. 28 indicates the cranks on opposite ends of the shaft and are connected to the piston cross heads 29 by the usual connecting rods 30. In order that each piston 31 may partake of its respective cross-head's movement, each piston rod is threadedly connected to the latter as at 32. A supporting plate 33 is carried by each of the casings 19 and the cross plate 15. A U-shaped casting comprising a cross portion 34 and plate 35 is positioned between and attached to the plates 33. Each plate 35 carries a pair of brackets 36 for the pivotal support of rocker arms 37 to which are connected the rear ends of valve rods 10.

A suitable sheet metal oil tight casing 38 encircles the main engine frame and has its opposite ends secured to the cylinder headplate 2 and the ring frame 12 and is provided in its top with suitable hand holes 39 covered by plates 40 suitably connected to the casing. The bottom of the casing may or may not be provided with hand holes and cover plates as desired. Each side of the casing is provided with a hand hole 41 covered by a plate 42 whereby access may be had to the packing glands 23 and 24.

43 and 44 are lugs which project downwardly and upwardly from the cross bar 45 of the engine casing and are provided with apertures 46 to slidably receive the valve rods 10. Each valve rod is provided with a nut and washer 47 between which and the lugs 45 and 44 are positioned expansible springs 48 intended to actuate the valves in one direction.

The cross part 34 of the U-shaped casting is provided with four plunger rod casings 49 through which and the part 34 are slidably mounted plunger rods 50. The forward ends of these plunger rods engage and actuate the rocker arms 37 while the rear ends are provided with bearing rollers 51 for engagement with and actuation by the valve cams 52 and 53 carried by the cam sleeves 54 and 55. A spring surrounds each plunger rod 50 within the casing 49 and serves to normally hold the bearing rollers in contact with their respective cams. Each of the cams 52 and 53 consist of a circular disk formed with a lateral annular cam flange.

56 is a gear sleeve having a bevel gear 57 fixed on its rear end and meshing with a corresponding gear 58 fixed on the main crank shaft 26, while its forward end projects through the cam sleeves 54 and 55, cross part 34 of the U-shaped casting, and beyond the front ends of the cylinder heads for the purpose of driving the power pumps that are preferably located adjacent the steam generator. The rear end of the gear sleeve 56 is journaled in a suitable bearing 59 rising from the rear end of the T supporting plate 17, said bearing coöperating with the cross part 34 to maintain the valve cams in proper position.

A cam actuating sleeve or tube 60 extends longitudinally of the engine through the part 34 and into the gear sleeve 56. The rear end of this sleeve is provided with radial pins 61 which project through spiral slots 62 in the gear sleeve 56 and the spiral slots 63 in the cam sleeve 55 arranged in opposite directions to each other as clearly shown in Figs. 2 and 5. An actuating rod 64 extends through the sleeve 60, and has its inner or rear end provided with radial pins 65 which project through spiral slots 66 and 67 formed in the gear sleeve 56 and the cam sleeve 54, said slots being arranged in opposite directions to each other as clearly shown in Fig. 5.

Bearing in mind the fact that two of the bearing rollers 51 bear against the lateral cam flange 53 and the other two against the lateral cam flange 52, it will be apparent that by imparting a longitudinal movement to either the sleeve 60 or the rod 64 it will in turn cause the cams to rotate relative to each other by virtue of the oppositely arranged pairs of spiral slots so that any desired amount of adjustment may be made to the valves of one cylinder independent of those of the other cylinder to vary the lap and lead of said valves to obtain the greatest amount of efficiency or power and speed.

In the operation of the valve gear, the cam sleeves 54 and 55 and adjusting rod 64 and adjusting sleeve 60 rotate with the driving sleeve 56, and the cams 52 and 53 reciprocate the plunger rods 49 to rock the arms 37 and operate the valves at the proper time. The cam 52 operates the upper plunger rods 50 while the cam 53 operates the lower plunger rods 50. By shifting rod 64 and sleeve 60 longitudinally, this will change the relation of the cams with the driving sleeve or member 56 so as to advance or retard the opening and closing of the valves as desired, to change the lap and lead.

The engine proper is adapted to be connected to the rear axle housing by an annular coupling unit 68 having a flange 69 for connection with the enlarged ring frame or flange 12 at the rear end of the frame members 13 and also with the end flange 70 of the engine casing by bolts 71, and a flange 72 for connection with the standard rear axle housing 73 by bolts 74.

Brackets 75 are formed integral with the coupling unit and have straps 76 attached to them by bolts 77, said brackets and straps projecting through and into the axle housing to support the vehicle differential 78 and rear axles 79.

The hubs 80 of the differential casing are mounted in anti-friction bearings 81 positioned within the bracket hangers of the coupling unit and are adapted to be adjusted transversely of the hanger brackets by collars 82 threaded into the openings 83, said collars being locked in adjusted position by any suitable means, as at 83. 84 is the main differential drive gear meshing with a corresponding gear 85 fixed on the engine crank shaft. These gears can always be maintained in alinement with each other by the adjustment of the collars 82. From this construction it will be seen that should it be desired to remove the differential through the back of the axle housing it can be readily and quickly done by removing the axles 79, the cover plate 86, and the straps 76, whereupon the differential may be lifted out as a unit. On the other hand if found desirable the rear axles 79 may be removed together with the bolts 74 and the engine and the coupling unit as a whole may be then disconnected and removed from the front of the rear axle housing.

By the provision of this coupling unit means is provided for properly spacing the engine from the rear axle housing to compensate for the particular size of driving gear used. It is to be further understood that should a different size of gear be desired, this coupling unit can be removed and substituted with another one of a size to compensate for the substitute gear. Since the operation of this uniflow fluid expansion engine, with the exception of the valve gear, is the same as all engines of this type, it is not believed necessary to go into a detailed description of its operation, but that it will be readily understood by anyone skilled in the art. It is to be further understood that by the provision of a valve gear of the above stated character directly driven from the main crank shaft and manually operable and adjustable so that the engine valves may be adjusted independent of each other to vary their lap and lead, or admission and cut-off, provision is made for obtaining the maximum amount of power and speed from the engine, due especially to the quick and positive action of our special valve mechanism which forms the subject matter of a separate application. It is to be further understood that by making the engine casing, the connections of the coupling unit with the casing, and rear axle housing oil tight, that an oil bath can be provided for the various engine parts to work in noiselessly.

While we have described the principle of operation of our invention together with the form of device which we now consider to be the best embodiment thereof, we desire to have it understood that such changes in construction and arrangement of parts may be made when desired as are within the scope of the appended claims.

Having thus fully described our invention, what we claim as new is:

1. An automobile propulsion mechanism embodying a rear axle housing, rear axles therein, a differential gearing between said axles, engine cylinders having a head plate, a frame rigid with said plate and extending toward the axle housing, a crank shaft mounted in said frame, a connection between said crank shaft and differential gearing, and an annular coupling unit located between said frame and axle housing and having its opposite ends rigidly secured thereto, to connect the frame and axle housing, said unit having brackets extending into the axle housing and embracing the axles.

2. An automobile propulsion mechanism embodying a rear axle housing, engine cylinders having a head plate, a frame rigid with said head plate and extending therefrom toward the axle housing, that end of the frame nearest the axle housing being enlarged, a crank shaft mounted in said frame, a casing surrounding the frame and connected at one end to said head plate, and a coupling unit located between said frame and axle housing and rigidly secured to said housing, said coupling unit, enlarged end of the frame and corresponding end of the casing being secured together.

3. An automobile propulsion mechanism embodying a rear axle housing, engine cylinders having a head plate, a frame rigid with said plate and extending toward the axle housing, a crank shaft mounted in said frame, an annular coupling unit located between said frame and axle housing and rigidly secured to said housing, a casing connected at one end to said head plate, and surrounding said frame, that end of the frame nearest the housing having an enlarged flange located between and secured to the ends of said coupling unit and casing to rigidly connect the frame and coupling unit.

In testimony whereof we have signed our names to this specification in the presence of two subscribing witnesses.

WILLIAM P. COOK.
HARTLEY O. BAKER.

Witnesses:
C. E. SMALL,
FRANCIS J. BISHOFF.